Oct. 26, 1948.  J. J. ROGERS  2,452,210
COMBINED ILLUMINATING AND RADIATING TYPE HEATER
Filed April 18, 1946
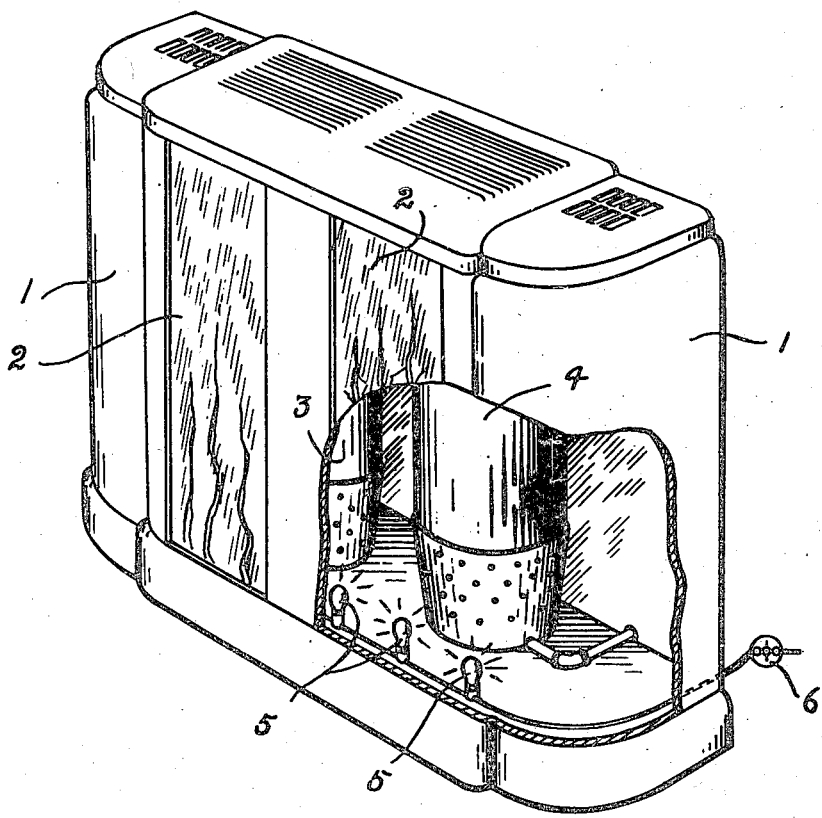
INVENTOR.
Jesse J. Rogers.
BY Geo Stevens.
Atty.

UNITED STATES PATENT OFFICE 2,452,210

COMBINED ILLUMINATING AND RADIATING TYPE HEATER

Jesse J. Rogers, Duluth, Minn.

Application April 18, 1946, Serial No. 663,154

3 Claims. (Cl. 126—97)

This invention relates to stove-like heaters and especially to those of the type more or less portable and wholly enclosed in which the heat may be furnished by electricity, gas, oil, or other liquid fuel, the same being further characterised by the major portion of the front of the receptacle or stove being at least partly transparent as by preferably vari-colored glass or the like suggestive of heat waves, rising flames, smoke or the like and through which when light occurs within the stove such coloring of the front will appear attractive and at least suggestive of warmth and comfort.

Thus the principal object is to provide simple auxiliary lighting means within the receptacle and in front of the heating element therein for illuminating directly through the front of the receptacle individually or in conjunction with the heating element within the receptacle.

Other objects and advantages will appear as the description of the invention proceeds.

In the drawing forming part of this application the single illustration is a perspective view of one common type of heater or stove a portion of the near wall thereof being broken away for better illustration of the invention.

The reference numeral 1 represents the outer usually opaque wall of the casing of the heater including the front end and top walls, the top wall having heat escape openings, as shown; and 2—2 one form of preferably somewhat iridescent and/or partly transparent glass or the like forming a part of the central front of the stove.

3 and 4 represent one type of heating element as for gas or the like and which when heating may have more or less radiancy which, as previously stated, may be augmented as by a row of electric bulbs as indicated at 5.

However, if peradventure the heating elements 3 and 4 may not be functioning at all the electric bulbs 5 may be made to function and give a much similar consoling effect with a possible noticeable saving of fuel much to the credit of the invention.

The control for the auxiliary radiance producing elements is shown at 6.

Having thus described one embodiment of my invention what I claim and desire to secure by Letters Patent is:

1. In a heater of the type described, a substantially rectangular shaped casing including opaque vertical front and end walls and an opaque top provided with heat escape openings, and a floor, the front wall of the casing including vertically disposed, spaced, flat, transparent panels extending from top to bottom of the casing and in the same plane of the opaque front wall portions, spaced vertically disposed heating means rising directly from the floor of the casing toward the top of the casing and positioned in spaced vertical parallelism with the respective panels for heating purposes and to illuminate the casing, and a row of spaced radiance producing elements installed in the casing and supported from the floor of the casing in front of both of said heating means and disposed close to the said panels to illuminate the interior of the casing and to transmit light rays laterally directly to and through the transparent panels to thereby augment the lighting capacity of the heater or to selectively light and heat the interior of the casing by said heating means or illuminate the interior of the casing by the radiance producing elements.

2. In a heater of the type described, a casing including imperforate, flat, opaque, vertical front and rear and end walls and a top, the top having heat escape openings, a floor for the casing, the front of the casing including vertically disposed spaced, flat, transparent panels extending from top to bottom of the casing, and in the same flat vertical plane of the front opaque wall, a heating means disposed within the casing to light and heat the interior of the casing, and a radiance producing element installed in the casing on the floor of the latter and close to said panels to transmit light rays directly to and through the transparent panels to thereby augment the lighting capacity of the heater or to selectively light and heat the interior of the casing by the heating means or illuminate the interior of the casing by the radiance producing element.

3. In a heater of the type described, a casing including imperforate, flat, opaque, vertical front and rear and end walls, a floor, and a top having heat escape openings, the front of the casing including a vertically disposed, flat, transparent, vari-colored panel extending from top to bottom of the casing and in the same vertical plane of the front opaque wall, a vertically disposed heating means rising directly from the floor toward the top of the casing and positioned in spaced vertical parallelism with said panel for heating purposes and to illuminate the interior of the casing, and a radiance producing element installed in the casing and supported from the floor of the casing between said heating means and said panel and disposed close to the latter to illuminate the interior of the casing and to transmit light rays laterally directly to and through said transparent panel to thereby augment the heating capacity of the heater or to selectively light and heat the interior of the casing by said heating means and illuminate said vari-colored panel or illuminate the interior of the casing to illuminate said panel by the radiance producing element.

JESSE J. ROGERS.

REFERENCES CITED

The following references are of record in the file of this patent:

UNITED STATES PATENTS

| Number | Name | Date |
| --- | --- | --- |
| 2,011,982 | Richardson | Aug. 20, 1935 |
| 2,302,796 | Oyster | Nov. 24, 1942 |